(12) United States Patent
Skidmore et al.

(10) Patent No.: US 11,176,098 B2
(45) Date of Patent: Nov. 16, 2021

(54) METHODS AND SYSTEMS FOR PROVIDING CUSTOMIZED VIRTUAL AND AUGMENTED REALITIES

(71) Applicant: EDX Technologies, Inc., Austin, TX (US)

(72) Inventors: Roger Ray Skidmore, Austin, TX (US); Eric Reifsnider, Raleigh, NC (US)

(73) Assignee: EDX Technologies, Inc., Austin, TX (US)

( * ) Notice: Subject to any disclaimer, the term of this patent is extended or adjusted under 35 U.S.C. 154(b) by 0 days.

(21) Appl. No.: 15/995,705

(22) Filed: Jun. 1, 2018

(65) Prior Publication Data

US 2018/0349403 A1 Dec. 6, 2018

Related U.S. Application Data

(60) Provisional application No. 62/513,591, filed on Jun. 1, 2017.

(51) Int. Cl.
| | | |
|---|---|---|
| *G06T 19/00* | (2011.01) | |
| *G06F 16/174* | (2019.01) | |
| *H04W 4/60* | (2018.01) | |
| *H04W 4/00* | (2018.01) | |
| *G06T 19/20* | (2011.01) | |
| *H04W 4/02* | (2018.01) | |

(52) U.S. Cl.
CPC ........ *G06F 16/1756* (2019.01); *G06T 19/006* (2013.01); *G06T 19/20* (2013.01); *H04W 4/00* (2013.01); *H04W 4/60* (2018.02); *G06T 2219/2024* (2013.01); *H04W 4/02* (2013.01)

(58) Field of Classification Search
CPC .................................................. G06T 19/006
See application file for complete search history.

(56) References Cited

U.S. PATENT DOCUMENTS

| | | | | |
|---|---|---|---|---|
| 6,307,567 B1 * | 10/2001 | Cohen-Or | ............... | G06T 15/10 345/473 |
| 6,438,266 B1 * | 8/2002 | Bajaj | ....................... | G06T 9/001 382/154 |
| 10,553,029 B1 * | 2/2020 | Waggoner | ............ | H04N 13/161 |
| 2009/0112970 A1 * | 4/2009 | Dawson | .................. | G06F 16/95 709/202 |
| 2013/0088492 A1 * | 4/2013 | Jagadev | ................ | G06T 17/005 345/428 |
| 2013/0132466 A1 * | 5/2013 | Miller | ..................... | H04L 67/02 709/203 |

(Continued)

*Primary Examiner* — Ryan McCulley
(74) *Attorney, Agent, or Firm* — W&C IP

(57) ABSTRACT

Methods are disclosed for providing alternate reality (e.g., virtual reality) representations to users. Exemplary methods employ data collections (e.g., stacks) which affect the virtual representations of baseline virtual models. Data collections contain layers which contain deltas. The deltas specify modifications to the baseline virtual reality world or model. The deltas may be geocoded, while the layers that contain them may not be geocoded. Separately selectable layers are used to temporarily modify or substitute baseline data or virtual elements (e.g., virtual objects) that are ultimately presented to a user on an output device. Conflict resolution algorithms harmonize conflicts between layers of a collection.

16 Claims, 2 Drawing Sheets

(56) References Cited

U.S. PATENT DOCUMENTS

| | | | |
|---|---|---|---|
| 2015/0123967 A1* | 5/2015 | Quinn | G06T 13/40 |
| | | | 345/420 |
| 2016/0253839 A1* | 9/2016 | Cole | H04N 13/344 |
| | | | 345/420 |
| 2016/0314626 A1* | 10/2016 | Roetcisoender | G06F 16/13 |
| 2017/0243403 A1* | 8/2017 | Daniels | G06F 3/147 |
| 2018/0023964 A1* | 1/2018 | Ivanov | G01C 21/30 |
| | | | 701/411 |
| 2018/0308287 A1* | 10/2018 | Daniels | G06T 19/20 |

* cited by examiner

METHODS AND SYSTEMS FOR PROVIDING CUSTOMIZED VIRTUAL AND AUGMENTED REALITIES

CROSS-REFERENCE TO RELATED APPLICATIONS

This application claims the benefit of U.S. provisional patent application No. 62/513,591, filed Jun. 1, 2017, the complete contents of which are herein incorporated by reference.

FIELD OF THE INVENTION

The invention generally relates to virtual reality (VR) and augmented reality (AR) and, in particular, VR and AR representations which involve geocoded data such as geocoded virtual objects.

BACKGROUND

A visual representation of a traditional virtual reality world that is modeled after the real world is constructed from baseline data that includes geodata and geocoded virtual object data. An example of a virtual reality world modeled after the real world is a virtual downtown Manhattan in which virtual objects which appear as streets signs, buildings, roads, and bridges correspond geodetically with real street signs, buildings, roads, and bridges in the real world downtown Manhattan. The real world downtown Manhattan is in a constant state of change, one of the most notable changes being the construction of new buildings. When a new building is constructed in the real world downtown Manhattan, a desirably arises to update the virtual model of downtown Manhattan to also show the new building and thus maintain an up-to-date model of the real world place. Traditionally, this update would involve editing or replacing existing or initial data of the data set that describes that virtual world. In this process, the original data may be overwritten or deleted. This is but one example scenario of an existing use and modification of a virtual reality world.

Various problems arise from a modification or update process to a virtual world as described in the preceding paragraph. First, different users of the same baseline data may desire or have need of different modifications or updates. In some instances, the changes needed by a user A and the changes needed by a user B are mutually exclusive. In other instances, the changes needed by user A may be tailored specifically to the needs of user A, in which case it is preferable to user B that the changes are not made at all. It is not possible to answer these problems with custom baseline data sets for each user. Virtual worlds which are based on real world places are in large part proprietary, owned by companies like Google who maintain strict regulation of the baseline dataset even after its usage is licensed out to various users. As a result, customization of the baseline data is difficult or impossible for all but the owner of the baseline data.

SUMMARY

According to an aspect of some embodiments, data collections containing geocoded data are accessed, and separately selectable layers of the data collections are used to modify or substitute baseline data for virtual elements (e.g., virtual objects) that are ultimately presented to a user on an output device.

Although the alternate reality representations of the baseline data may be modified or substituted according the needs of specific user, the baseline data itself as stored may remain unaltered.

In an aspect of some embodiments, a new data organization method and structure is employed which allows novel virtual reality and augmented reality representations on displays and other output devices.

In another aspect of some embodiments, new methods for producing virtual reality and augmented reality representations are provided which permit customization of baseline datasets describing virtual reality worlds (i.e., virtual reality models).

A particular alternate reality representation, be it in virtual reality or augmented reality, may be based on a combination of different augmentation feeds from a variety of different sources. The augmentation feeds are meaningfully combined to provide a uniform and predictable alternate reality representation. This objective is fulfilled in some embodiments using a data stacking approach whereby data that describes virtual objects and other virtual world elements are organized into stacks. Each stack includes at a minimum baseline data that describes virtual elements (e.g., virtual objects) for a location. The stack may further include any number of customized layers which contain deltas. Deltas provide modifications to the baseline data. The original baseline data is not itself altered, but rather it is combined with one or more deltas to created altered representations (e.g, visual displays) that may be unique for different users.

As a specific illustrative example, consider the case of a user of an augmented reality system where the user is a mining company (more particularly, an employee of a mining company). Baseline data may indicate a field at a particular geolocation. However, the mining company has converted the field into a hole which, moreover, continues to grow each passing day. A customized layer, which contains one or more deltas, may be stored and updated that accurately reflects the existence of the hole at the geolocation in question and the hole's up-to-date depth. Another user of the same baseline data may be an airline (more particularly, a pilot employed by the airline) that has no need or desire of knowing that a hole exists at the geolocation in question. The airline is concerned with changes at the field which would give rise to increases in elevation, such as the erection of a cell tower or a skyscraper, but depressions in the earth are of little to no concern. It is therefore adequate if not desirable to continue to serve the airline baseline data which represents a field at the geolocation in question yet serve the mining company with a representation based on the baseline data that has been modified or substituted with the customized layer that describes the hole.

DETAILED DESCRIPTION

Figure 1:
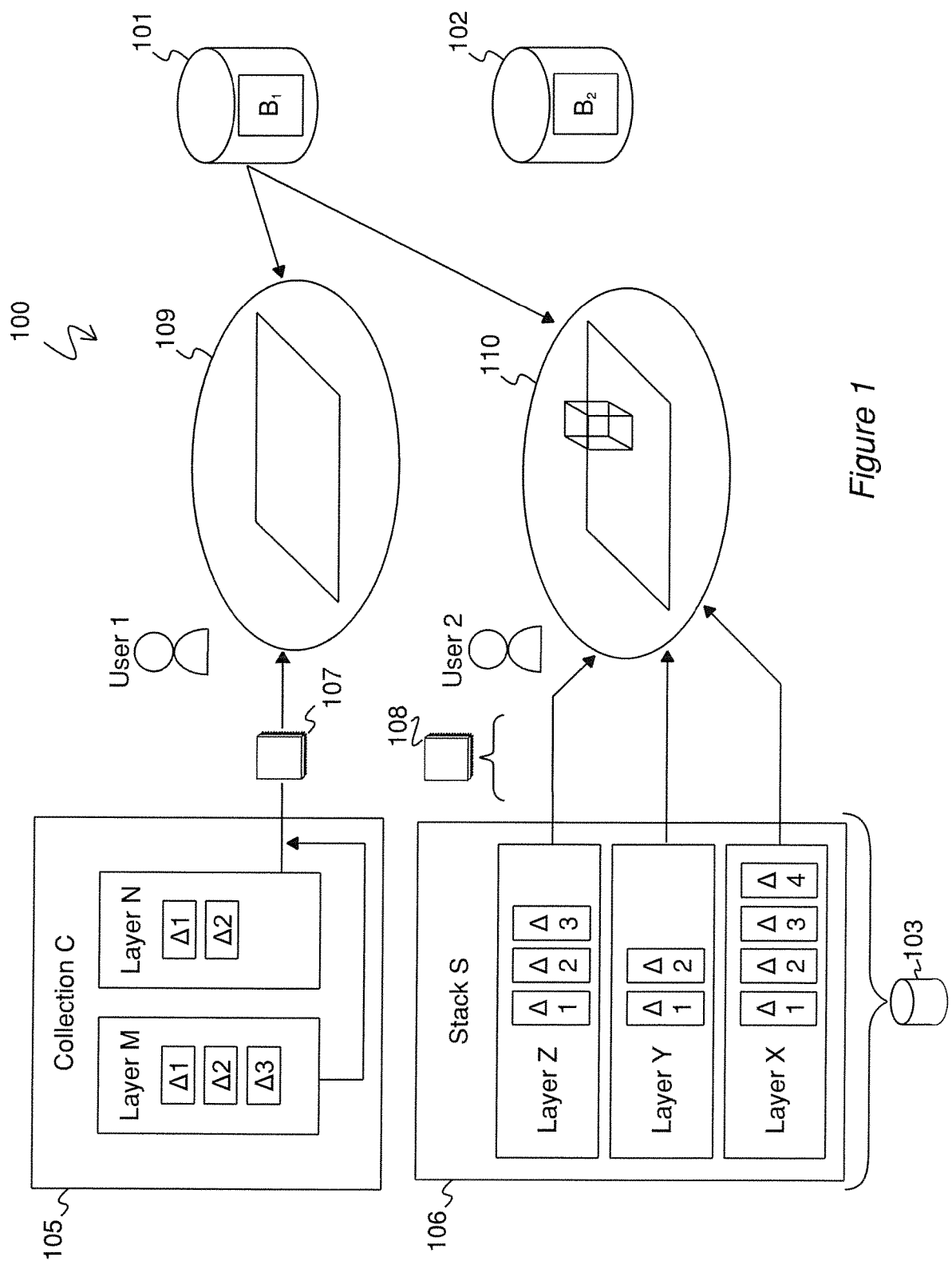
FIG. 1 is an exemplary system for producing an augmented reality representation based on a data collection containing deltas to a baseline geocoded data set.

FIG. 1 shows an exemplary system 100 for producing customized augmented reality representations based on data collections containing deltas which modify baseline data of a baseline virtual model. The illustrative system 100 comprises databases 101 and 102 which store baseline data sets that describe baseline virtual models $B_1$ and $B_2$. Layers M, N, X, Y, and Z are stored in one or more databases 103. Users 1 and 2 require virtual reality outputs based on baseline virtual model $B_1$. However, each of User 1 and User 2 requires separate customizations of the baseline virtual model $B_1$. To provide user-specific customizations to the baseline model, the system 100 comprises one or more processors 107 and 108 configured to receive requests from User 1 and User 2 specifying the collections 105 and 106 to be used for producing alternate reality outputs. The one or more processors 107 and 108 are configured to process the user requests and, in conjunction with output devices, apply the requested collections to the baseline data to generate the customized outputs. The system 100 includes the separate collections 105 and 106, labeled Collection C and Stacks S, respectively. These collections, like the layers of which they are comprised, may be stored in one or more databases 103.

A stack of layers is a collection of layers in which the layers are assigned an explicit and strict ordering, lowest to highest, with no layers sharing the same position in the stack. Other collections may have layers which are structured in more complex ways, e.g., using an algorithm that determines which layer takes precedence based on a complex relationship calculated against potentially dozens of metadata fields and/or other attributes of the layers. An example of a more complicated ordering may be that if each layer has three metadata fields A, B, and C, then the determination of whether layer 1 takes precedence over layer 2 might be "a layer takes precedence if A1>A2, or if that is not the case, if B1+(C1*A1)<B2+(C2*A2)".

Each collection 105 and 106 contains multiple layers. In particular, Collection C contains two layers, Layer M and Layer N. Stack S contains three layers: X, Y, and Z. Each layer contains one or more deltas which specify particular changes or modifications to a baseline virtual model. Collection 105 is used by processor(s) 107 to modify baseline model $B_1$ for User 1, while collection 106 is used by processor(s) 108 to modify baseline model $B_1$ for User 2. The system 100 is thus able to provide different virtual reality representations to the separate users. Despite both virtual realities 109 and 110 being based on the same baseline model $B_1$, each user is displayed a different virtual reality output with virtual representations customized according to different collections, 105 or 106.

Baseline data $B_1$ or $B_2$ may include a baseline set of geodata for any predefined geographic area, such as the planet, or some portion of the planet (e.g., a continent, a country, a state, a county, etc.).

The layers of a data collection 105 or 106 each contain one or more "deltas," which in FIG. 1 are labeled with the Greek letter "Δ". Deltas may be selected, deselected, or not selected. If a delta is selected, the virtual objects corresponding with the geolocation in question are based on a combination of the baseline data for that geolocation but with the modifications described by the selected delta. If a delta is deselected or not selected, it has no effect on the alternate reality representation for the geolocation in question. In short, an exemplary delta specifies a change with respect to the baseline. An alternative exemplary delta specifies a change with respect to another layer. According to the latter delta type, one layer may modify the augmented reality representation resulting from a separate layer.

The deltas specified in a layer may take the form of either an area of effect (e.g., lat/long point, or rectangle on the surface of the Earth specified as two lat/long corners, or a list of lat/long points that outlines an irregular area, or a 3D area such as a box specified via three lat/long/altitude points, etc.) or alternatively would specify a particular object, either as a linking pointer in the database or as an identifier. The changes to the area of effect, or to the specified object, are then described in the delta. For example, an area of effect might be painted green whereas the baseline is colored brown, or it might be geocoded to indicate it was now forested whereas the baseline was open ground. Or for an object, the object might be replaced wholesale by another 2D or 3D object, or it might have a delta expressed in terms of a change to the shape, color, or metadata of the object or of one of its subunits. For example, if an object is formed from a red sphere topped by a green cube, the delta might change the green cube to yellow. Or if an object has metadata of dBm received signal power associated with it, that metadata might have its numerical value updated by a delta.

Though the deltas in a layer would be very specific about either an object or an affected location or area, the layer itself has no location and no association with a specific object. A single layer may, for example, contain changes to a baseline which are sprinkled over the entire planet within a planet wide baseline model.

The deltas in a single layer may be related to one another on one or more of several different grounds. In some instances, the deltas in a single layer may be related by the source or author of the deltas. In some cases, the deltas in a single layer may be related by an event that caused the deltas. In some cases, the deltas in single layer may be related by the version of a subscription service that provides the deltas. In still other cases other bases may exist for a group of deltas to share a common layer.

The layers that compose a collection (e.g., a stack) are chosen and grouped to be used at the same time, due to a user's desire to combine inputs from various sources and dates of issue to serve a particular purpose for the virtual view. The layers chosen would be those relevant to the user's task at hand, and the resolution algorithm (human-aided in some cases) would combine the deltas in the layers to compose a net VR presentation.

In many instances, a plurality of layers are used concurrently for producing an alternate reality representation. This is the case in FIG. 1. Layers M and N of Collection C are used concurrently to modify baseline model $B_1$ for creating a customized alternate reality representation for User 1. Layers X, Y, and Z of Stack S are used concurrently to modify baseline model $B_1$ for creating a customized alternate reality representation for User 2. To any extent two or more layers conflict, one or more conflict resolution algorithms may be used to resolve the conflict prior to presentation with an output device. An exemplary conflict resolution algorithm is sequential application of layers based on a predetermined ranking or priority system so that ultimately one layer controls for each conflict. An exemplary conflict resolution algorithm enforces sequential application of layers so that the layer higher in the stack always wins in the case of a conflict. For instance, in Stack S, a layer which is higher in the stack may have priority over any layers which are lower in the stack. Therefore, Layer Z has priority over Layers X and Y. Layer Y has priority over Layer X but not over Layer Z. A variety of different conflict resolution algorithms may be employed by different embodiments.

A collection may have as few as one layer. On the other hand, a collection may have tens, hundreds, or thousands of customized layers stacked together for a particular user or a particular use. Indeed, from a functional perspective, there is not a hard upper limit on the number of layers or deltas that may be combined in single collection.

In consideration of the large numbers of layers which may be employed together in a single collection (e.g., stack), a significant aspect of some embodiments centers on the process of selecting which layers of a given stack are used to create the alternate reality representation. The corollary to this is the identification of which layers of a given collection are not selected for use to create the alternate reality representation.

Some exemplary embodiments comprise channels or steps involving use of channels, where a given channel corresponds to a given collection. An exemplary collection for a channel includes layers of augmented reality content. An exemplary collection for a channel may further include one or more other layers consistent with other embodiments described herein. An exemplary system may provide a user with access to a plurality of channels, the user having the option to switch between or among channels using a VR or AR device. Changing channels causes a change in the collection relied upon to provide a VR or AR output to the user. As an illustrative example, a user may be walking down a particular street with an AR headset that provides the user with an AR experience by which pink clouds are displayed and buildings along the street are colored rainbow. These augmentations are produced in connection with a particular collection of layers. The user may then provide an input to the AR device instructing the device to change to another channel, and suddenly the user is walking through tombstones on the ground with zombies following the user. The tombstone and zombie augmentations are the product of a second collection which is now being relied upon by the AR device to produce an AR output to the user.

In some but not all respects, a channel of AR content is analogous with a TV channel, in that changing a channel changes the output (and source content for the output). However, a channel according to present embodiments involves content that is geocoded to the real world. Each channel is built through combining a certain set of layers of data. The consumption of AR content may be implemented from the user's perspective simply by the user selecting which channel he or she wants to experience. An exemplary device or system makes available the plurality of channels and uses the appropriate collection of layers to provide an output in dependence on the most recent channel selection received from the user.

An exemplary implementation for layer selection is a subscription process. A particular user may subscribe to specific layers according to various conditions or parameters. For instance, ownership rights may be assigned to specific layer, and selection of the layer for use in creating an alternate reality representation may be dependent on whether a user has ownership or license rights to the layer. As another example, a specific layer may be tagged or labeled to associate the layer with a specific industry. For instance, referring back to the mining company example above, the layer which describes the hole in the field may have a "mining" tag which would attract subscriptions from mining companies and constructions companies, for instance, but not necessarily aviation companies.

The subscription system of selection allows changes to be made to layers by an active party while passive parties that subscribe to the same layer experience altered representations (e.g., augmentations) as a result of the changes made by the active party. For instance, a layer may be provided that describes weather conditions to be simulated virtually. The weather layer may be modified over time by an active party such as the National Weather Service. Users that subscribe to the weather layer such as road maintenance companies, construction companies, towing companies, snow plowing service companies, airlines, and ordinary individuals (e.g., without relevant company affiliations) may all have their virtual representations of the weather change in accordance with the modifications to the weather layer made by the National Weather Service.

In short, users can subscribe to individual layers and receive recurrently updated feeds of data for those particular layers. If active parties with proper access rights make modifications, layers may be changed or new deltas added. Users subscribe to one or more levels within each stack. A VR our AR device using the stored data pulls from particular layers when creating an alternate reality representation based on the subscriptions.

Layers may be assigned rankings or priorities. Layers may also have predefined combinations. As an illustrative example, a stack may consist of three layers, referred to as Layers X, Y, and Z, respectively. A condition may be stored in the databases that Layers X and Z are always used in combination. Another condition may be stored which specifies that Layer Z is always to be given priority over Layer Y, such that if both layers are selected and a conflict exists between Layer Z and Layer Y, Layer Z controls.

Separate layers that belong to the same collection may be stored together or separately. For instance, users may separately store their own proprietary layers which are accessed by a central processor only at such time that they are combined with the baseline data for providing an alternate reality representation. In short, layers which affect a single geolocation may be received from different sources which constitute different feeds to a central system. The processor(s) of the central system are configured to combine and integrate the separate feeds prior to providing the alternate reality representation (e.g., displaying a virtual reality for the geolocation). A given layer may be included in multiple collections or stacks.

Some information may only be represented in a VR or AR representation (e.g., represented as an augmentation) if the information in question appears in at least two different layers. A processor may be configured to compare two or more layers for shared information and then produce the alternate reality representation in reliance on the shared information and in nonreliance on information that fails to exist in all of the compared layers.

In general, layers function to modify or substitute baseline data. In FIG. 1, for example, Layers X, Y, and Z all act on baseline model $B_1$. This is represented in FIG. 1 by the arrows being drawn directly from each layer in Stack S to the virtual reality output 110. Layers may also or alternatively function to modify or substitute the data of other layers. More specifically, as illustrated in FIG. 1 by Collection C, a layer M may affect what data of layer N is used in an augmentation. Layer M may cause layer N to become "invisible," in other words it is not used in the augmentation representation of output 109. In an absence of layer M, however, layer N would be used in creating the augmentation in output 109.

Figure 2:
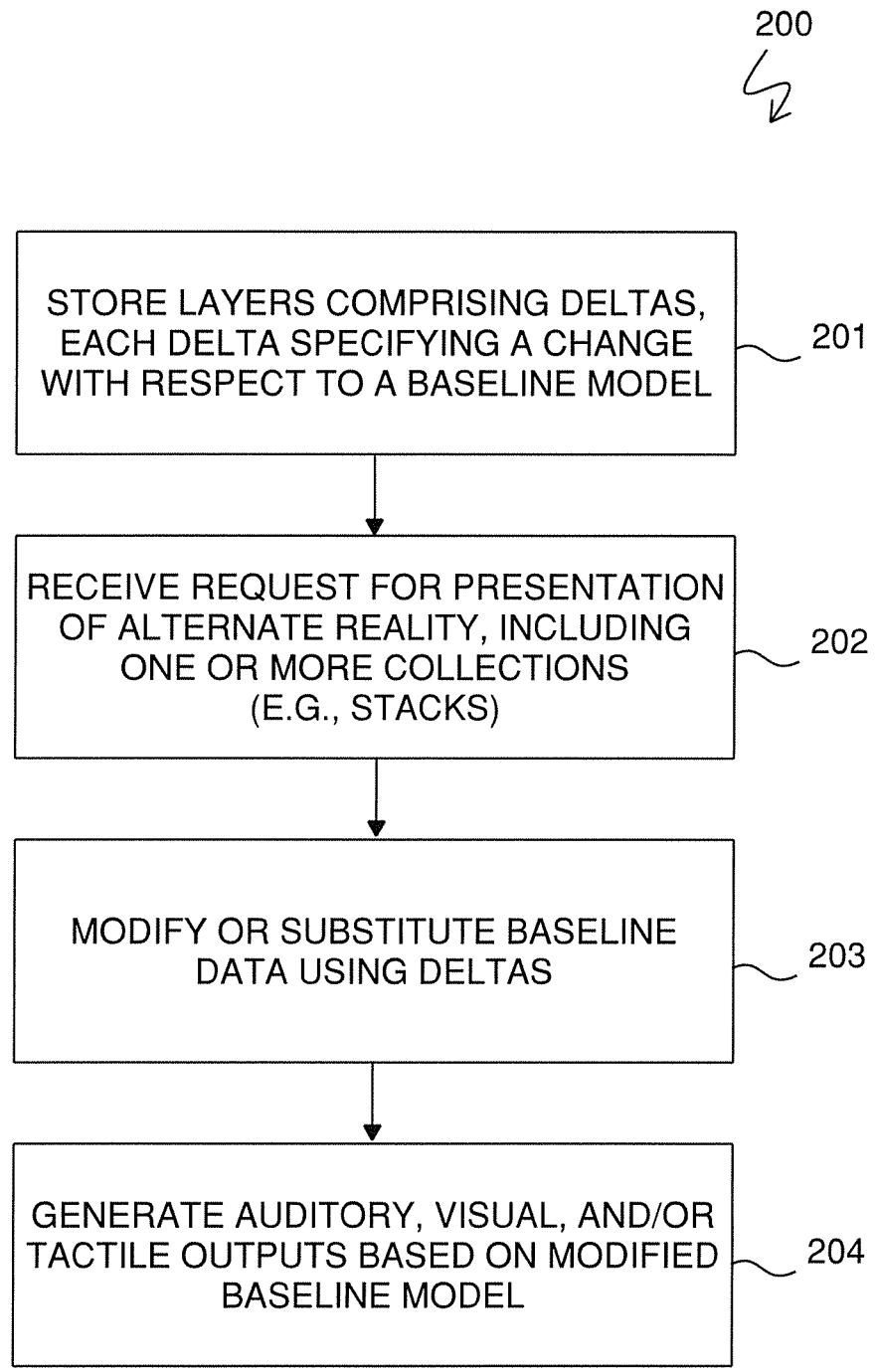
FIG. 2 is an exemplary process for producing an augmented reality representation based on a data collection containing deltas to a baseline geocoded data set.

FIG. 2 shows an exemplary method 200 for providing a customized alternate reality to a user. At block 201, one or more databases store data useable to modify or substitute baseline data of a baseline model, the customized data being stored as layers which comprise groups of deltas, each delta specifying a change with respect to the baseline model. At block 202, one or more processors receive a request for presentation of a virtual or augmented reality, wherein the request specifies one or more collections of one or more layers for presentation. At blocks 203 and 204, the one or more processors provide, in communication with one or more output devices, a virtual reality or augmented reality output based on the baseline model, including for each collection, (i) temporarily modifying or substituting the baseline data in accordance with the one or more layers specified by the request, and (ii) generating one or more of auditory, visual, and tactile outputs using the temporarily modified or substituted baseline data.

The databases 101, 102, and 103 (see FIG. 1) may be or comprise computer readable storage media that are tangible devices that can retain and store instructions for use by an instruction execution device like processors. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or schematic diagrams of methods, apparatus (systems), and computer program products according to embodiments of the invention. It will be understood that each block of the flowchart illustrations and/or block diagrams, and different combinations of blocks in the flowchart illustrations and/or block diagrams, may be implemented by or with the use of computer readable program instructions and by or with one or a plurality of processors and supporting hardware, software, and firmware.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. This may have the effect of making a general purpose computer a special purpose computer or machine. A "processor" as frequently used in this disclosure may refer in various embodiments to one or more general purpose computers, special purpose computers, or some combination thereof. Computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

As used herein, "alternate reality" encompasses both "augmented reality" and "virtual reality". Augmented reality, or "AR", is a direct or indirect experience of a physical, real-world environment in which one or more elements are augmented by computer-generated sensory output such as but not limited to sound, video, graphics, or haptic feedback. Augmented reality is frequently but not necessarily live/in substantially real time. It is related to a more general concept called "mediated reality", in which a view of reality is modified (e.g., diminished or augmented) by a computer. The general intent is to enhance one's natural perception of reality (e.g., as perceived by their senses without external devices). In contrast to mediated reality, "virtual reality" replaces the real world with a simulated one. Augmentation is conventionally in real-time and in semantic context with environmental elements. For example, many Americans are accustomed to augmented reality when watching American football on a television. A football game as captured by video cameras is a real world view. However, the broadcasting company frequently augments the recorded image of the real world view with the line of scrimmage and first down markers on the field. The line and markers do not exist in reality, but rather they are virtual augmentations that are added to the real world view. As another example, in televised Olympic races, moving virtual lines can be superimposed on tracks and swimming pools to represent the position of a runner or swimmer keeping pace with the world record in the event. Augmented reality that is not in in real-time can be, for example, superimposing the line of scrimmage over the image of a football match that is being displayed after the match has already taken place. Augmented reality permits otherwise imperceptible information about the environment and its objects to supplement (e.g., be overlaid on) a view or image of the real world.

Virtual reality, or "VR", involves substituting real world environmental stimuli with simulated stimuli. VR systems frequently obscure a user's vision of real world surroundings completely and serve as the sole source of light stimuli experienced by a user's eyes at a given instance in time. VR systems may also include auditory and tactile output devices which may include components that block external stimuli associated with real world surroundings. For instance, in-ear and over-ear headphones provide passive attenuation of external sounds which are not produced by the VR system. Active noise cancellation of external sounds may be also employed by some VR systems.

"Geo-coded" is an adjective used herein to indicate that the noun it modifies, usually a datum or data of a particular type (e.g., asset data or measurements data), is paired with geographical location information identifying a geographic point (e.g., latitude and longitude and elevation, physical address, etc.) with which the noun (e.g., the datum or data) is associated. GIS data is a geo-code with which other data may be geo-coded. As an example, a measurement of signal strength is geo-coded to identify a particular geographic location where that measurement was taken. As another example, asset information such as the specs of a base station is geo-coded so that it is possible to pinpoint exactly where the base station is physically located.

Location information may be absolute (e.g., latitude, longitude, elevation, and a geodetic datum together may provide an absolute geo-coded position requiring no additional information in order to identify the location), relative (e.g., "2 blocks north of latitude 30.39, longitude −97.71 provides position information relative to a separately known absolute location), or associative (e.g., "right next to the copy machine" provides location information if one already knows where the copy machine is; the location of the designated reference, in this case the copy machine, may itself be absolute, relative, or associative). Absolute location involving latitude and longitude may be assumed to include a standardized geodetic datum such as WGS84, the World Geodetic System 1984. In the United States and elsewhere the geodetic datum is frequently ignored when discussing latitude and longitude because the Global Positioning System (GPS) uses WGS84, and expressions of latitude and longitude may be inherently assumed to involve this particular geodetic datum. For the present disclosure, absolute location information may use any suitable geodetic datum, WGS84 or alternatives thereto.

An "output device", as used herein, is a device capable of providing at least visual, audio, audiovisual, or tactile output to a user such that the user can perceive the output using his senses (e.g., using her eyes and/or ears). In many embodiments, an output device comprises at least one display, at least one speaker, or some combination of display(s) and speaker(s). The output device may also include one or more haptic devices. A suitable display (i.e., display device) is a screen of an output device such as a mobile electronic device (e.g., phone, smartphone, GPS device, laptop, tablet, smartwatch, etc.). Another suitable output device is a head-mounted display (HMD). In some embodiments, the display device is a see-through HMD. In such cases the display device passively permits viewing of the real world without reproducing details of a captured real world image feed on a screen. In a see-through HMD, it is generally only the augmentations that are actively shown or output by the device. Visual augmentations are in any case superimposed on the direct view of the real world environment, without necessarily involving the display of any of the original video input to the system. Output devices and viewing devices may include or be accompanied by input devices (e.g., buttons, touchscreens, menus, keyboards, data ports, etc.) for receiving user inputs. Some devices may be configured for both input and output (I/O).

While the invention has been described herein in connection with exemplary embodiments and features, one skilled in the art will recognize that the invention is not limited by the disclosure and that various changes and modifications may be made without departing from the scope of the invention as defined by the appended claims.

What is claimed is:

1. A method for augmented reality (AR), comprising
storing in one or more databases customized geodata useable to modify or substitute baseline geodata of a baseline model of a virtual world, the customized geodata being stored as layers which comprise groups of deltas, one or more of the deltas specifying a change with respect to the baseline model,
wherein the virtual world is modeled after the real world with the virtual world containing virtual objects which correspond geodetically with real objects in the real world,
wherein at least one delta reflects a real world change not already reflected in the baseline geodata of the baseline model;
receiving, with one or more processors, a request for presentation of an augmented reality, wherein the request specifies one or more collections of one or more layers for presentation;
providing, with the one or more processors in communication with one or more output devices, an augmented reality output based on a temporarily modified baseline model, including for each collection,
temporarily modifying or substituting the baseline geodata of the baseline model in accordance with the one or more layers specified by the request, and
generating AR content containing one or more of auditory, visual, and tactile outputs, wherein the AR content is geocoded to the real world according to the temporarily modified baseline model,
wherein both the baseline geodata and the group of deltas specifying changes pertain to a same particular location or locations, wherein the baseline geodata is not altered by the providing step, and
wherein at least one delta of the deltas specifies a change with respect to another layer other than the layer in which the at least one delta exists.

2. The method of claim 1, wherein the request received at the receiving step is a subscription request.

3. The method of claim 1, wherein the request received at the receiving step is a channel selection, wherein a given channel corresponds to a given collection of layers, and wherein a change in channel causes a change in collection relied upon to generate the one or more of auditory, visual, and tactile outputs.

4. The method of claim 1, wherein the layers have assigned ranking or precedence, with no two layers sharing a same rank or a same precedence, wherein the one or more layers specified by the request outrank or take precedence over corresponding baseline geodata, and wherein implementation of the one or more layers in the providing step complies with the assigned ranking or precedence.

5. The method of claim 1, wherein at least one delta specified in a layer takes the form of an area of effect, wherein the layer has no intrinsic area of effect.

6. The method of claim 1, wherein at least one delta specified in a layer specifies a particular object, wherein the layer has no intrinsic association with the particular object.

7. The method of claim 6, wherein the at least one delta specifies the particular object as a linking pointer in a database or as an identifier.

8. The method of claim 1, wherein the layers are stored and subsequently sourced from a plurality of different sources.

9. A system for augmented reality (AR), comprising
one or more databases configured to store customized geodata useable to modify or substitute baseline geodata of a baseline model of a virtual world, the customized geodata being stored as layers which comprise groups of deltas, one or more of the deltas specifying a change with respect to the baseline model, wherein the virtual world is modeled after the real world with the virtual world containing virtual objects which correspond geodetically with real objects in the real world;
one or more processors configured to execute instructions causing the one or more processors to perform
receiving a request for presentation of an augmented reality, wherein the request specifies one or more collections of one or more layers for presentation, wherein at least one delta of at least one of the layers reflects a real world change not already reflected in the baseline geodata of the baseline model;
providing, in communication with one or more output devices, an augmented reality output based on a temporarily modified baseline model, including for each collection,
temporarily modifying or substituting the baseline geodata of the baseline model in accordance with the one or more layers specified by the request, and
generating AR content containing one or more of auditory, visual, and tactile outputs, wherein the AR content is geocoded to the real world according to the temporarily modified baseline model,
wherein both the baseline geodata and the group of deltas specifying changes pertain to a same particular location or locations,
wherein the baseline geodata is not altered by the providing step, and
wherein at least one delta of the deltas specifies a change with respect to another layer other than the layer in which the at least one delta exists.

10. The system of claim 9, wherein the request received is a subscription request.

11. The system of claim 9, wherein the request received is a channel selection, wherein a given channel corresponds to a given collection of layers, and wherein a change in channel causes a change in collection relied upon to generate the one or more of auditory, visual, and tactile outputs.

12. The system of claim 9, wherein the layers have assigned ranking or precedence, with no two layers sharing a same rank or a same precedence, wherein the one or more layers specified by the request outrank or take precedence over corresponding baseline geodata, and wherein implementation of the one or more layers in the providing step complies with the assigned ranking or precedence.

13. The system of claim 9, wherein at least one delta specified in a layer takes the form of an area of effect, wherein the layer has no intrinsic area of effect.

14. The system of claim 9, wherein at least one delta specified in a layer specifies a particular object, wherein the layer has no intrinsic association with the particular object.

15. The system of claim 14, wherein the at least one delta specifies the particular object as a linking pointer in a database or as an identifier.

16. The system of claim 9, wherein the layers are stored and subsequently sourced from a plurality of different sources.

* * * * *